US011648896B2

(12) United States Patent
D'Angelo et al.

(10) Patent No.: US 11,648,896 B2
(45) Date of Patent: May 16, 2023

(54) DISCHARGE CONTROL CIRCUIT, CORRESPONDING SYSTEM, VEHICLE AND METHOD

(71) Applicant: STMicroelectronics S.r.l., Agrate Brianza (IT)

(72) Inventors: Vittorio D'Angelo, Nocera Superiore (IT); Salvatore Cannavacciuolo, Villaricca (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/480,418

(22) Filed: Sep. 21, 2021

(65) Prior Publication Data

US 2022/0097632 A1    Mar. 31, 2022

(30) Foreign Application Priority Data

Sep. 29, 2020   (IT) .................. 102020000022966

(51) Int. Cl.
*B60R 16/03*    (2006.01)
*H02J 7/00*    (2006.01)
*H02J 7/34*    (2006.01)

(52) U.S. Cl.
CPC .......... *B60R 16/03* (2013.01); *H02J 7/00711* (2020.01); *H02J 7/007182* (2020.01); *H02J 7/345* (2013.01)

(58) Field of Classification Search
USPC ....................................................... 307/127
See application file for complete search history.

(56) References Cited

U.S. PATENT DOCUMENTS

| 2016/0164506 A1* | 6/2016 | Almazon ............. H03K 5/1534 327/182 |
| 2016/0268919 A1* | 9/2016 | Halberstadt ............. H02M 7/06 |
| 2018/0145503 A1* | 5/2018 | Minagawa ............. H02M 1/32 |
| 2019/0199200 A1 | 6/2019 | Eberlein et al. |

FOREIGN PATENT DOCUMENTS

| EP | 3068022 A1 | 9/2016 |
| WO | 2017186419 A1 | 11/2017 |

* cited by examiner

*Primary Examiner* — Toan T Vu
*Assistant Examiner* — Xuan Ly
(74) *Attorney, Agent, or Firm* — Slater Matsil, LLP (57) ABSTRACT

In an embodiment a circuit includes drive circuitry configured to be coupled to a control terminal of an electronic switch and configured to apply a discharge signal to the control terminal causing the electronic switch to become conductive and provide an electrical discharge path for an energized element, a sensing node configured to be coupled to the control terminal and configured to sense a voltage at the control terminal and a feedback network coupled between the sensing node and the drive circuitry, wherein the feedback network includes a comparator circuit coupled to the sensing node and configured to compare the voltage at the control terminal and sensed at the sensing node with a reference threshold and to provide a comparison signal having a first value and a second value, respectively, in response to the voltage at the control terminal being higher or lower than the reference threshold, and wherein the drive circuitry is configured to produce the discharge signal as a function of the comparison signal.

20 Claims, 4 Drawing Sheets

DISCHARGE CONTROL CIRCUIT, CORRESPONDING SYSTEM, VEHICLE AND METHOD

CROSS-REFERENCE TO RELATED APPLICATIONS

This application claims the benefit of Italian Patent Application No. 102020000022966, filed on Sep. 29, 2020, which application is hereby incorporated herein by reference.

TECHNICAL FIELD

The description relates to discharge circuits.

BACKGROUND

Traction inverters for EVs may include a high-voltage (HV) capacitor, currently referred to as direct-current (DC) link capacitor, briefly, DC-Link.

Such a capacitor may be a rather "huge" component, having a high capacitance value (1 mF or even more) which may be charged to high voltages, in excess of 800 V, for instance.

Various scenarios such as: motor "ignition" OFF, loss of power supply (e.g. 12V), controller (e.g., MCU) "dead" benefit from that capacitor being rapidly discharged.

Generally, quickly discharging a DC-Link is desirable in all conditions where inadequate discharge could lead to hazard conditions such as unwanted motor torque generated or exposure of a driver, passenger or any operator to an electric shock.

While not a mandatory specification, discharging the DC-link voltage below 60 V in less than is facilitates avoiding electrical shock hazard and is frequently selected as an advantageous option based on extensive experience.

An active discharge of the DC-link voltage by deliberately performing a shoot-through on each phase "leg" of the vehicle motor is an option which may be considered for that purpose. This action can be somewhat paralleled to a hard system failure, which is otherwise undesirable due to possible fire hazard: in fact, if not properly controlled, the current during shoot-through could easily reach several kA in a few hundred nanoseconds.

Discharging the DC-Link in a single iteration is hardly feasible and a PWM (pulse-width modulation) strategy can be considered where a high-side (HS) switch is kept permanently ON, that is, conductive, and a low-side (LS) driver is switched on and off with a signal to which PWM is applied in order to generate intermittent shoot-through.

It is observed that the timing of such a PWM action may be critical. The current in the output stage may increase with a 10 A/ns slope and insufficient accuracy in controlling current evolution may easily lead to serious damage. Also, the slope of the current during the shoot-through discharge is difficult to predict in a reliable manner.

In fact such a parameter depends on many factors, namely: DC-Link voltage during discharge, value of parasitic inductance of the discharge loop, ambient temperature, HS/LS driver output current characteristics, and/or HS/LS driver input gate charge characteristics.

All these entities are mutually inter-related and may vary rapidly during a shoot-through discharge, which militates against implementing a real-time estimation and compensation strategy.

Notionally, an associated controller such as a MCU capable of applying a PWM signal with a frequency in the range of tens of kHz and a resolution of few ns might provide such a precise control.

This approach is hardly feasible insofar as various factors contribute to the uncertainty in the PWM signal duration (primarily in the "on" time, $T_{ON}$), namely: the propagation delay of the PCB traces from the MCU to the input of the gate driver, the propagation delay of the gate driver circuit, which may be implemented via a mixture of analog and digital gates, variations in the charge/discharge resistors connected between the output of the gate driver and the input of the HV switch (HS/LS), and/or variations in the HV switch input characteristics, such as gate charge.

All the quantities mentioned above are subject to process and temperature spread and the uncertainty resulting from the combination of the above quantities is generally too high to meet the application specifications related to controlling the discharge current in a precise way.

Hence, even an ideal controller capable of generating signals with a notionally infinite accuracy would end up by being of no avail due to the uncertainty introduced by the transfer function from the MCU output to the HV switch output current.

Also, achieving accurate timing via an open-loop strategy would involve bench trials and would be exposed to temperature and process spread.

Closed-loop strategies based on driver temperature sensing and protection from overheating would otherwise result in a slow and ineffective mechanism, since the external driver would inevitably operate close or beyond the Safe Operating Area or SOA. Additionally, closed-loop strategies based on temperature sensing may involve a so-called "estimated observer", where an increase in driver temperature represents an effect indicative of the intensity of an overcurrent phenomenon.

Limiting a temperature increase while modulating an "on" resistance, Rdson in an electronic switch such as a field-effect transistor may involve an expensive cooling system, which may have an impact on the overall cost of the system.

Finally, strategies aiming at limiting the current peak using a two-level turn-off approach would result in HV driver overstress, eventually leading to reliability issues.

Increasing the HV driver equivalent resistance by lowering its gate drive voltage is an effective technique to reduce current slope and peak.

However, in so doing, conduction losses dramatically increase, leading to possible SOA violation (SOA=Safe Operating Area).

Being able to implement a DC-Link active discharge without using additional circuitry would likewise be desirable insofar as this may lead to savings in the final Bill of Material (BoM).

Documents such as Chinese Patent Application Nos. 109713886 A, 109245505 A or 111244927 A are exemplary of prior activity in this sector.

SUMMARY

Embodiments provide contribution in addressing the various issues outlined in the foregoing.

Embodiments provide traction systems for electric vehicles (EVs) or power conversion systems exploiting a high-voltage energized element for filtering or stability purposes.

Further embodiments provide any type of apparatus where fast de-energization for functional and/or safety purposes is a desirable feature.

Other embodiments provide a corresponding system. A traction system for an electric vehicle (EV) may be exemplary of such a system.

One or more embodiments may relate to a corresponding vehicle, such as an electric vehicle (EV).

One or more embodiments may relate to a corresponding method.

One or more embodiments facilitate quick discharge of a DC-link capacitor in a HV converter essentially exploiting an already existing functional driver stage.

One or more embodiments involve a discharge strategy based on a quick closed-loop control which facilitates control of the output stage current, which in turn facilitates operation of a HV driver in a Safe Operating Area (SOA) during a whole discharge process.

One or more embodiments adopt a control strategy which is based on the monitoring of the real duty-cycle applied to the control terminal (gate) of an external driver, such a control strategy being insensitive to propagation delays.

One or more embodiments can be embedded in an integrated circuit (IC) with the capability of facilitating a DC-link discharge function at a system level, with reduced complexity and risk in comparison with existing solutions.

More generally, one or more embodiments can be implemented in systems (DC/DC or AC/DC or DC/AC converters, for instance) where an energized element is desired to be discharged within a short time, hardly compatible with normal operation timings.

One or more embodiments may lead to a less expensive BoM in comparison with conventional solutions: this may be related to the fact that no (additional) active discharge circuitry is contemplated.

For that reason, one or more embodiments may similarly lead to a reduction in PCB space insofar as additional active discharge circuitry (several resistors and a power MOS transistor, for instance) can be avoided.

One or more embodiments may correspondingly lead to improved performance in terms of Failure In Time (FIT): fewer components involve fewer FITs.

One or more embodiments may adopt a fast closed-loop strategy, which may be insensitive to propagation delays and process spread of the low-voltage (LV) domain circuits.

One or more embodiments do not involve "reporting" temperature or phase voltage to a MCU using isolated comparators insofar as corresponding functions as desired can be implemented in the HV domain.

One or more embodiments facilitate monitoring the real duty-cycle applied to control terminal (gate) of an external driver (exploiting a MC pin, for instance).

One or more embodiments may comprise a (fast) analog comparator which facilitates quick reaction times when sensing the gate voltage.

One or more embodiments involve a simple mixed-signal circuit comprising a programmable analog delay and discrete logic gates.

As noted, one or more embodiments rely on a closed-loop strategy implemented in the HV domain, which is insensitive to process and temperature spread of all the LV domain circuits.

In one or more embodiments, such an implementation facilitates operating an external switch in a Safe Operating Area (SOA) during a whole discharge process.

It is once more recalled that, while traction systems in electric vehicles (EVs) will be primarily referred to in the following by way of example of a possible context of use of embodiments, the embodiments are not limited to that possible context of use. As noted, one or more embodiments can be applied, for instance, in power conversion systems exploiting a high-voltage energized element for filtering or stability purposes or, more generally, in those application contexts involving fast de-energization for functional and/or safety purposes.

BRIEF DESCRIPTION OF THE DRAWINGS

One or more embodiments will now be described, by way of example only, with reference to the annexed figures.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Figure 1:
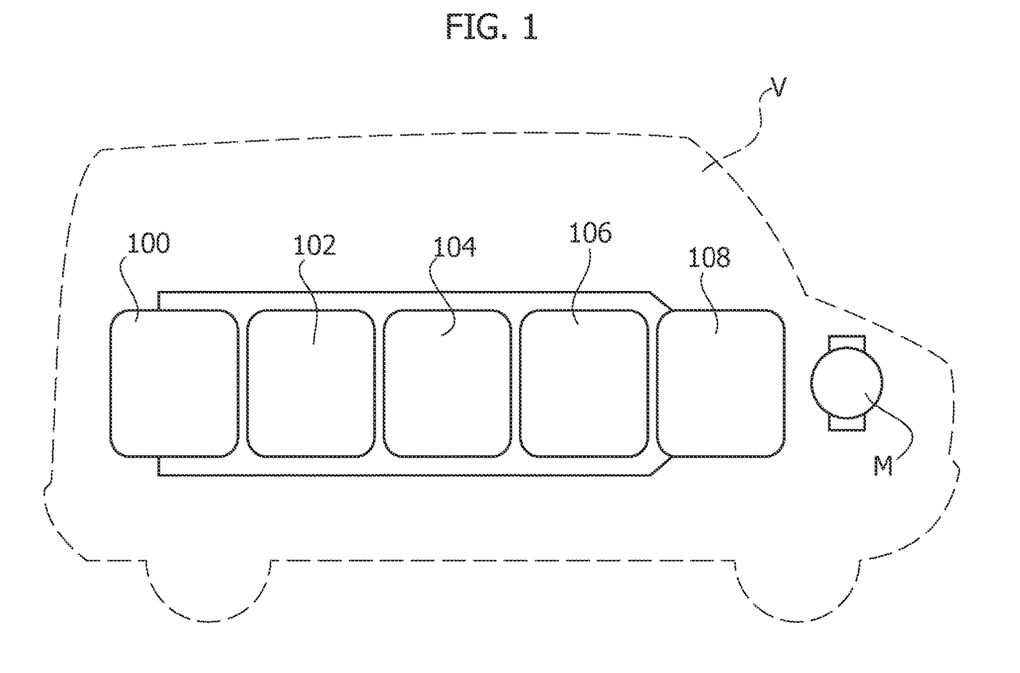
FIG. 1 is a functional block diagram of a traction system for an electric vehicle (EV) which is exemplary of a possible context of use of embodiments.

FIG. 1 is a functional block diagram of a traction system for an electric vehicle (EV) designated V, whose outline is schematically reproduced in dashed lines.

In that respect, it is once more recalled that, while traction systems in electric vehicles (EVs) will be primarily discussed in this exemplary description, the embodiments are not limited to that possible context of use.

As noted, one or more embodiments can be applied, for instance, in power conversion systems exploiting a high-voltage energized element for filtering or stability purposes or, more generally, in contexts involving fast de-energization for functional and/or safety purposes.

The core of a system as exemplified herein is represented by a (multi phase) electric motor M driven by a drive chain based on electronic circuitry comprising integrated circuits (semiconductor chips or dice).

Such a drive chain as illustrated in FIG. 1 may comprise, for instance:

a set of low-voltage (LV) die safety mechanisms 100, a first high-voltage (HV) die group 102 configured to provide functions such as undervoltage (UV)/overvoltage monitoring for voltage—high (OV VH), undervoltage monitoring for voltage—low (UV VL), thermal shutdown, watchdog, brake control 104, a second high-voltage (HV) die group 106 configured to provide functions such as desaturation (DES), current sensing (overcurrent/short circuit—ISEN), overtemperature (TSEN OT) as well as shoot-through discharge as discussed in the following, and/or a third high-voltage (HV) die group 108 configured to provide functions such as active VDS/VCE clamping (VCECLAMP), overvoltage monitoring for voltage—low (OV VL), gate command voltage monitor (VGE).

VGE is a safety mechanism checking consistency of a received gate drive logic command with the status of HV driver gate. For instance, if the HV driver receives an OFF command from the control logic, the gate voltage of the HV driver should fall below an "OFF" threshold within a defined (possibly programmable) filter time.

It will be otherwise appreciated that, with the exception of the shoot-through discharge function as discussed in detail in the following (which can be advantageously included in the second high-voltage die group 106) the arrangement illustrated in FIG. 1 can be regarded as conventional in the art, which makes it unnecessary to provide a more detailed description herein.

A traction inverter for an electric vehicle (EV) driving an electric motor M including three sets (or "phases") of windings energized via respective electronic switches such as power transistors according to a Space Vector Modulation scheme may be exemplary of such a conventional arrangement.

For simplicity of presentation and explanation, this description will refer primarily to a single phase (and a single switch), being otherwise understood that the same principles discussed herein can be extended to plural phases/switches.

Also, it will be appreciated that the one illustrated in FIG. 1 is merely exemplary of one of a variety of possible contexts of use of the embodiments: as noted, one or more embodiments can be implemented in systems (DC/DC or AC/DC or DC/AC converters, just to mention a few examples) where an energized element is desired to be discharged within a short time.

Figure 2:
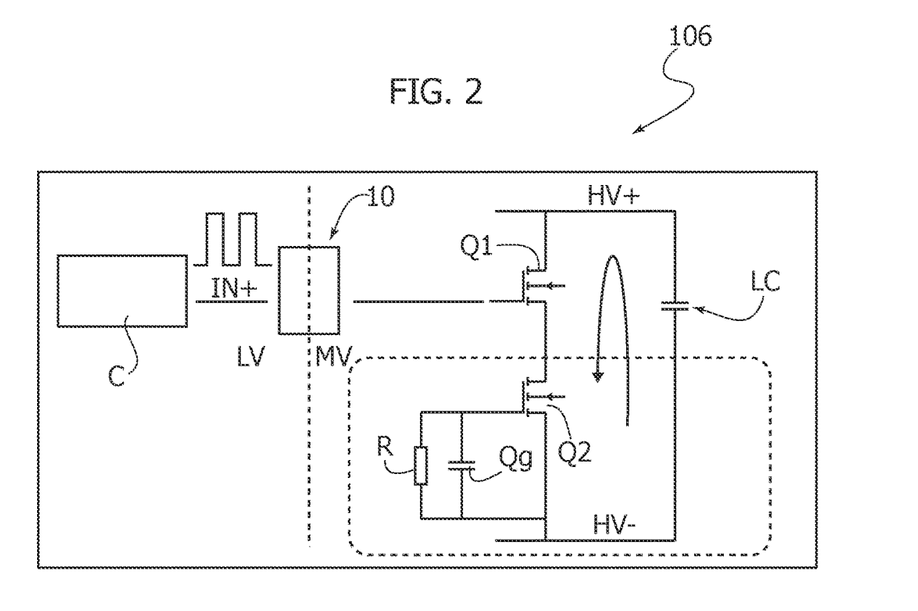
FIG. 2 is circuit diagram exemplary of an approach in implementing a solution as illustrated in FIG. 1.

As illustrated in FIG. 2 (and referring again for simplicity to the context of use exemplified in FIG. 1) such an energized element may include a high-voltage (HV) capacitor, currently referred to as direct-current (DC) link capacitor, or, briefly, DC-Link. As noted, such a capacitor may be a rather "huge" component, having a high capacitance value (i mF or even more) which may be charged to high voltages, in excess of 800 V, for instance.

One or more embodiments provide a shoot-through discharge function which can be advantageously implemented in connection with an isolated gate driver 10 providing galvanic isolation between a low-voltage side LV and a high voltage side HV, this latter including two power switches Q1 and Q2 arranged between high voltage rails HV+ and HV− with the capacitor LC coupled there between.

The two power switches Q1, Q2 may include power transistors such as (Silicon Carbide or SIC) power MOSFETs or Insulated Gate Bipolar Transistors (IGBTs).

In the exemplary case illustrated in FIG. 2, the two power switches designated Q1 and Q2 are exemplary of "phase" switches of the motor M, with the parallel connection of a resistor R and a capacitor Qg exemplary of the gate of Q2.

It is noted that in an arrangement as exemplified herein the transistors Q1 and Q2 do not represent additional switches used to implement the shoot-through discharge function: in an arrangement as exemplified herein, the transistors Q1 and Q2 are "functional" switches used to drive an electrical load.

For instance, the transistors Q1 and Q2 may be the switches that drive the "U" phase of the motor M, with other pairs of switches (currently referred to as Q3/Q4 and Q5/Q6, not visible for simplicity) used to drive the "V" phase and the "W" phase, respectively, of the motor M.

As discussed in the following, these switch (transistor) pairs may also provide an ASC (Asynchronous Stop Command) feature. This is a safety feature which brakes the motor M in the presence of conditions militating against effective control of the motor torque.

A shoot-through discharge technique as exemplified herein can be implemented in parallel on the three phases, which may thus co-operate in discharging the DC-Link during shoot-through.

In a circuit as exemplified in FIG. 2 a shoot-through command IN+ can be generated as a functional signal (produced as a backup by a controller C such as a MCU included in a system as illustrated in FIG. 1), with less priority than any other safety mechanism. For instance, a backup MCU in the low-voltage (LV) domain may generate (in a manner known per se to those of skill in the art) a IN+ signal as a PWM signal to be transformed into shoot-through pulses.

In one or more embodiments, the shoot-through function can be advantageously implemented in the HV domain, via a redundant logic such as a safety MCU, for instance.

By way of example, one or more embodiments may exploit a BRAKE pin (currently used to implement the ASC function discussed previously) in order to trigger the shoot-through action. This may involve implementing "fuzzy" logic circuitry with a double-threshold comparator (see FIG. 3A discussed in the following) capable of distinguishing an ASC request from a shoot-through request.

Such a solution advantageously uses a single pin to implement two functions with no penalties in terms of pin count in comparison with conventional solutions.

One or more embodiments facilitate implementing a shoot-through function (wholly) on the HV side exploiting the same signal path as the ASC function, without penalizing temporal resolution.

It is noted that a BRAKE pin on the HV side (devoted to ASC) may be regarded as a conventional feature. However, using that pin for shoot-through is exposed to the propagation delay (and the related uncertainty) of the BRAKE comparator and associated pre-driver stage. One or more embodiments may address that issue by resorting to a closed-loop layout where the BRAKE pin is used to trigger the shoot-through action, while delays are compensated via the closed loop.

A shoot-through command could also be considered as a safety path signal, with—for instance—a backup MCU in the high-voltage (HV) domain applying a signal such as a PWM brake signal (see block 104 in FIG. 1) to be transformed into shoot-through pulses.

Architectures as discussed previously may benefit from the shoot-through signal being included in a functional path with a priority dictated by the implementation of the functional path, with a shoot-through signal which does not move the associated finite state machine (FSM) to a SAFE LCKO state (Safe LockOut, essentially a force OFF exit) and re-engagement occurring automatically at the next PWM rising edge.

It is noted that discharging a DC-Link using a controlled shoot-through action is per se conventional in the art.

This action may involve, for instance, controlling the peak discharge current by modulating the RDSon of a transistor providing a discharge path, lowering the gate voltage resorting to a 2LTO (Two Level Turn-Off) technique.

One or more embodiments facilitate maintaining the discharge switch in the SOA ("Safe Operating Area").

Advantageously, one or more embodiments may avoid "masking" overcurrent/desaturation diagnostic functions which may come in conflict with the shoot-through function. In fact, in one or more embodiments, the peak current will not trigger protections, insofar as the peak value is seen by the system as a "functional" value.

One or more embodiments facilitate maintaining diagnostic priorities unaltered, which results in safer system operation. At least in principle, even an erroneous configuration of the shoot-through function leading to an undesirably high discharge current can be remedied in one or more embodiments by the intervention of the overcurrent or de-saturation protection of the outer switch.

A factor of interest in implementing a DC-Link discharge function as discussed herein lies in limiting the discharge current by controlling the switch-on time of a discharge switch, which can be managed directly, while avoiding the inherent drawbacks of the 2LTO (Two Level Turn-Off) technique discussed previously, where the current can be limited through the RDSon (drain-to-source resistance of the switch when conductive) of the low-side switch.

As discussed, this way of limiting the peak current entails a number of disadvantages, which become particularly evident in view of the current trend towards smaller switches (SiC/IGBT/MOSFET): for a same value for RDSon, a smaller switch exhibits a reduced resistance to short circuits. For that reason, maintaining SOA operation of the switches is highly desirable.

To that effect, one or more embodiments may adopt an approach where:
a high-side switch HS is forced to a steady "ON" (conductive) state;
a PWM (Pulse-Width-Modulated) signal is applied to a low-side switch LS, having a $T_{ON}$ value (switch conductive) which is higher than a desired ON time insofar as this "true" ON time can be obtained via an internal clamping action as discussed in the following in connection with FIGS. 4 and 5).

Of course, one or more embodiments may adopt a complementary approach where the low-side switch LS is forced to a steady "ON" state and a PWM signal is applied to the high-side switch LS.

Both strategies can be considered viable to perform effective shoot-through discharge.

In certain embodiments, system software can select either strategy depending on the initial scenario before starting the procedure (e.g. status of the HS/LS switches, presence of short failures, and other factors influencing the choice of the discharge strategy).

The related ON/OFF signals can be managed via a "safing" logic C on the LV side (see FIG. 2, by way of example) and on the HV side, with an ASC capability via a BRAKE signal maintained as discussed previously.

It is noted that a safing logic in the LV domain will disable a related interlock prior to implementing the shoot-through action. Conversely, with a safing logic in the HV domain, interlocking is implemented in the LV die and is thus bypassed.

Also it is noted that in one or more embodiments managing BRAKE priority with respect to VH UV is not required, insofar as one or more embodiments do not involve modulating the voltage VH.

As discussed, by referring to an exemplary—yet not mandatory—application to traction inverters, one or more embodiments are intended to address issues which may arise in response to certain conditions (motor "ignition" discontinued or off, IGN OFF, for instance), where it is desired to discharge the DC-Link (essentially, the capacitor LC) to counter an undesirably high storing of energy in the high-voltage or HV domain (when the vehicle V is not powered, for instance).

As repeatedly noted, such a capacitor may be a rather "huge" component, having a high capacitance value (1 mF or more) which may be charged to high voltages, in excess of 800 V, for instance.

In arrangements as exemplified in FIG. 1 a passive discharge function can be (already) provided for general safety purposes, implemented by means of bleeding resistors, for instance. This facilitates a constant, yet fairly slow discharge path.

An active discharge function may also be provided subject to "enable" acts, for instance in case of a collision (car crash) or when a high-voltage protective cover of an electronic control unit (ECU) is removed for maintenance purposes. For instance, such an active discharge function can be implemented by means of a dedicated switch whose energy is limited by series resistors. Such a function can bring the DC-Link voltage below 60 V in less than 1s, to prevent electric shock risk.

Such an active discharge function can be implemented on a HV NMOS-based board (mounted as low-side) and configured to be normally inactive (OFF), since the interlock short-circuits the gate-source voltage (VGS).

In response to a HV safety box cover being opened, the interlock is released, with a VGS self-generated from the DC-Link voltage and clamped by a discharge diode with the NMOS transistor maintained conductive (ON) until the DC-Link is fully discharged.

One or more embodiments exploit the traction module "phase" switches for the purpose of (rapidly) discharging the DC-Link while avoiding the risk of (serious) damage due to uncontrolled discharge current. Such an approach is beneficial in terms of cost reduction, and takes advantage of a precise shoot-through timing control in order not to overstress the phase switches by repeated overcurrent events.

In a context as exemplified in FIG. 1, the three-phase switches in the "legs" of the motor M can thus be used in the place of a LS NMOS transistor as in the case of active discharge as discussed previously.

In one or more embodiments (phase) interlocking is temporarily disabled, with the high-side HS (the low-side LS, respectively) kept permanently conductive (ON) and the low-side LS (the high-side HS, respectively) switched alternatively ON/OFF in a PWM mode to generate a shoot-through as desired.

As discussed previously, in one or more embodiments as exemplified herein, the current is not limited via resistors and can be controlled by accurately modulating the shoot-through time interval.

This facilitates taking into account the fact that the discharge current may rise with a 10 A/ns slope, which amounts to reaching values as high as 4 kA in 400 ns, which may result is serious damage.

Also, one or more embodiments facilitate providing a closed-loop control of the conduction times of a discharge switch.

This makes it possible to avoid contingencies where an "ON" command sent towards that switch may be subject to a propagation delay estimated inaccurately to the point that the switch may be undesirably forced to an "OFF" state immediately after receiving the "ON" command, or even prevented from receiving the "ON" command, thus remaining in an "OFF" state.

As discussed (and by referring to application scenarios as generally illustrated in FIGS. 1 and 2), the interlocking function can be temporarily disabled on both HS and LS drivers.

Advantageously, one or more embodiments can be applied in connection with an isolated gate driver of the type currently available under the trade designations L9502 and L9502B with companies of the STMicroelectronics group (see st.com), for instance using the IN_M_DIS bit in the register map designated LV SPI reg map (Safety Latent Register—a configuration having an impact on safety functions, thus under a "lock" key in order to counter undesired access to these registers).

In a L9502/L9502B isolated gate driver, the HS FET can be turned ON permanently while the DES/ISEN (DESATURATION e OVERCURRENT/SHORT CIRCUIT) protections will be active and configured as desired. The LS FET can be driven with a PWM (e.g. 20 kHz) signal at a low duty-cycle, which corresponds to a reduced value for $T_{ON}$ in comparison with $T_{OFF}$. Advantageously, the value for $T_{ON}$ generated by the associated controller (MCU) is selected higher than the propagation delay of the whole chain. In the case of embodiments relying on the L9502/L9502B platform, selecting a value for $T_{ON}$ of (at least) lop facilitates correct operation, avoiding undesired "skipped" pulses.

This may result in duty-cycles up to 50%, with pulse duration modulated as discussed in the following.

A dedicated circuit on the HV side can be provided configured to clamp the (e.g. LS) output pulse duration using a programmable delay.

In one or more embodiments, the delay can be selected with a view to limiting the output current peak to safe operating values.

Advantageously, the DES/ISEN protections are not triggered during shoot-through discharge other than in case of misconfiguration, in which case the DES/ISEN protections can be configured to take over and preserve the traction module from undesired damage.

Figures 3, 3A:
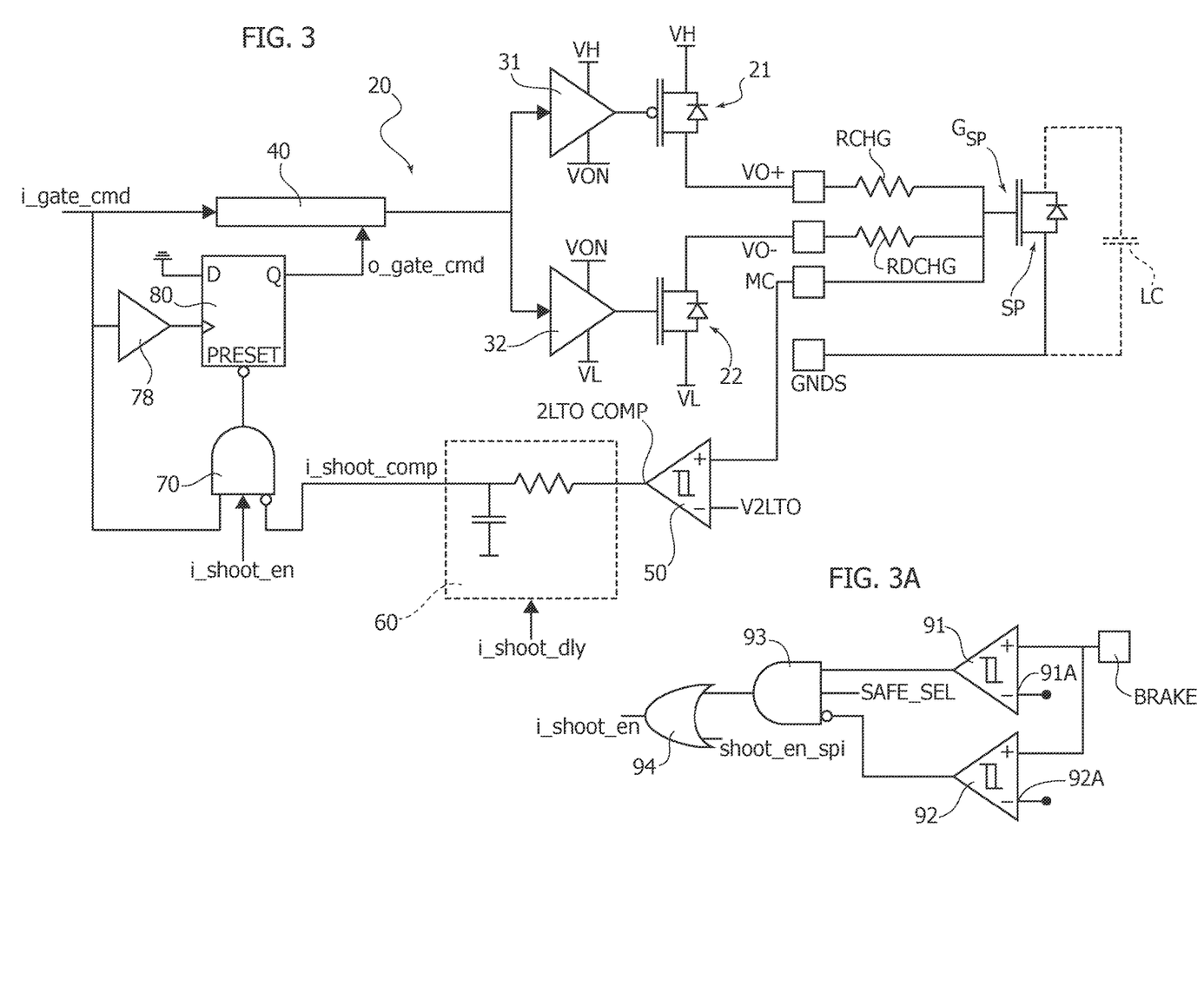
FIGS. 3 and 3A are exemplary circuit diagrams of embodiments.

FIG. 3 is a circuit diagram exemplary of embodiments of a discharge circuit 20 which can be advantageously included in an arrangement as illustrated in FIGS. 1 and 2.

Again it is noted that reference to such an arrangement shall not be construed in a limiting sense of the embodiments: one or more embodiments can be implemented in systems (DC/DC or AC/DC or DC/AC converters, just to mention a few examples) where an energized element is desired to be discharged within a short time, that is systems where fast de-energization for functional and/or safety purposes is a desirable feature.

For that reason, FIG. 3 more generally refers to a discharge circuit (20 as a whole) configured to discharge an energized element (here a DC-Link capacitor LC, shown in dashed lines) via at least one electronic switch SP.

By way of example, in an operating context as illustrated (in an exemplary and non-limiting manner) in FIG. 1, the electronic switch SP may be one of the "phase" switches of the motor M of an electric vehicle V configured to be operated according to a Space Vector Modulation scheme as conventional in the art.

Such an electronic switch SP includes a control terminal $G_{SP}$ (a gate, in the case of a field-effect transistor—either Si or SiC-based—or an IGBT as exemplified herein).

Briefly, a discharge control circuit 20 as illustrated in FIG. 3 comprises a pair of electronic switches 21, 22 (power MOSFET transistors, P-type and N-type, for instance).

Such a circuit 20 can be integrated as a pre-driver stage (for instance, in a device of the L9502/L9502B type as repeatedly discussed previously) and coupled to a discharge circuit including switches Q1 and Q2 as illustrated in FIG. 2. For instance, a circuit 20 are exemplified in FIG. 3 can be configured to (pre)drive a respective switch Qx in a traction inverter so that six circuits 20 can be provided in a traction inverter for driving the U, V and W phases in an electric motor, each phase including two switches such as Q1 and Q2.

For the sake of simplicity and ease of explanation, the structure and operation of a single circuit 20 coupled to a single (discharge) switch SP will be discussed in the following.

A circuit 20 as illustrated in FIG. 3 comprises:

a first (high-side or HS) switch 21 coupled between a first (high-side) voltage node VH and a first output node VO+, and a second (low-side or LS) switch 22 coupled between a second output node VO− and a second (low-side) voltage node VL.

The switches 21, 22 have their control terminals (gates, in the case of field-effect transistors such as MOSFETS) coupled to the outputs of respective drive circuits 31, 32 (supplied via the voltage node VH and a node VON and via the voltage node VON and the voltage node VL, respectively).

The drive circuits 31, 32 are in turn controlled by a gate drive logic circuit 40 to which a command signal i_gate_cmd (generated in a manner known to those of skill in the art) is applied.

The switch drives/types (p-type and n-type, for instance) are configured in such a way that the switches 21, 22 can be switched on and off (made conductive and non-conductive) to vary the voltage at the nodes VO+, VO− which is applied (via resistors RCHG and RDCHG) to the control terminal $G_{SP}$ (gate, in the case of field-effect transistor such as a power MOSFET) of the electronic switch SP.

That is, a pre-driver output stage as exemplified herein comprises a push-pull stage including the switches 21 and 22 forming a "split" output (VO+/VO−). The $G_{SP}$ turn-on can be achieved via the VO+ output, and the transition speed can be trimmed by changing the RCHG resistor value. Similarly, the $G_{SP}$ turn-off can be achieved via the VO− output, and the transition speed can be trimmed by changing the RDCHG resistor value.

While exemplified herein as a MOSFET, the switch SP may comprise any type of voltage-controlled power element such as a regular MOSFET, a Silicon Carbide (SiC) MOSFET, an Insulated Gate Bipolar Transistor (IGBT) or a Gallium Nitride (GaN) transistor, for instance.

As noted, the switch SP can be included in one of the "phases" (referred to ground GNDS, for instance) of an electric motor such as M in FIG. 1.

It is otherwise noted that both the switch SP and the energized element (a rather "huge" component in the case of a DC-Link capacitor) may be distinct elements from the embodiments.

Reference 50 denotes a comparator configured to compare the voltage at the control terminal (gate) of the electronic switch SP with a reference value V2LTO, produced in a manner known per se to those of skill in the art: such a comparator may be already included for safety/diagnostic purposes as 2LTO comparator in a L9502/L9502B isolated gate driver as repeatedly discussed in the foregoing.

Reference 60 denotes as a whole a (programmable) delay circuit coupled to the output of the comparator 50.

The programmable delay circuit 60 can be implemented in any way known to those of skill in the art in order to generate a fast programmable delay.

A chain of inverters or a capacitor/current circuit are exemplary of possible implementations of such a delay.

In one or more embodiments, the delay circuit 60 may comprise an analog delay (a RC lowpass circuit) which can be controlled (reset) via signal i_shoot_dly.

The signal i_shoot_dly can be generated (in a manner known per se to those of skill in the art) in such a way that the delay circuit 60 applies a controlled delay (for instance a delay selected in the range 0-70 ns, in a selected number of steps of 5-10 ns).

The (possibly) delayed output from the comparator 50 is applied (as i_shoot_comp) to a gate control logic including an AND gate 70 which receives at its inputs the logic complement of the signal i_shoot_comp, the command signal i_gate_cmd applied to the drive logic circuit 40, as well as a shoot-through enable signal i_shoot_en which may be generated as discussed in the following in connection with FIG. 3A.

The output from the AND gate 70 is applied as a PRESET signal (active low) to a flip-flop 80 clocked by the command signal i_gate_cmd.

A digital delay 78 is illustrated acting on the i_gate_cmd signal as applied to the clock input of the flip-flop 80. The digital delay 78 addresses synchronization issues and causes the clock pulses to reach the flip-flop 80 (only) after the gate 70 has released the reset command to the PRESET input (active low).

The input D of the flip-flop 80 is coupled to ground and the output Q from the flip-flop 80 is applied to the drive logic circuit 40 as an o_gate_cmd signal which may be generated (in manner known per se) according to the following truth table.

| PRESET | D | CLK | Q |
|---|---|---|---|
| 0 | X | X | 1 |
| 1 | X | ↑ | D |
| 1 | X | X | $Q_o$ |

In case the flip-flop 80 is disabled, e.g. in response to i_shoot_en=0, the o_gate_cmd signal assumes its inactive state (in the exemplary case illustrated this is high: high means push/pull stage forcing a low voltage on the driver's gate insofar as the HS illustrated is a PMOS).

Operation of a circuit 20 as exemplified in FIG. 3 is thus controlled via a gate control circuit for shoot-through operation (of a mixed analog-digital type) as a function of two digital signals (Serial Peripheral Interface or SPI signals, for instance) namely:

the shoot-through enable signal (SHOOT_EN) such as i_shoot_en as applied to the flip-flop 80, and a delay control signal (TSHOOT) such as i_shoot_dly as applied to the delay circuit 60.

The i_shoot_en enable signal may be a configuration bit stored in the register map (shoot_en_spi, Safety Latent Register). This may be the case when the shoot-through action is managed by a safety controller having access to the gate pre-driver reg map.

The i_shoot_en enable signal may also be a digital signal determined by the device logic. This may be the case when the shoot-through action is managed by a safety controller having no access to the gate pre-driver reg map, but having access to a safety relevant pin of the gate-predriver (the so-called BRAKE pin). The logic is able to sense BRAKE pin assertion (as discussed in the foregoing) and enable the shoot-through regardless of shoot_en_spi A possible i_shoot_en implementation may involve both implementations (by OR-ing their effects).

For instance the SHOOT_EN bit can be a SLR bit in the register map. When SPI driving is not adopted (shoot-through on the HV side) this can be bypassed via the BRAKE pin.

Similarly, the delay control signal (TSHOOT) may be a 3 bit SLR signal in a L9502/L9502B isolated gate driver.

FIG. 3A shows a possible approach in generating of the shoot-through trigger signal i_shoot_en, exploiting the same HV pin (say, "BRAKE") used for implementing the ASC (Asynchronous Stop Command) function. As exemplified herein, such a trigger signal can be generated by a safety circuitry implemented in the HV power stage (108 in FIG. 1).

Such a "safing" logic can be configured to drive a dedicated safety input (BRAKE, for instance) of the HV gate pre-driver in order to implement the ASC function.

Such a safety function acts in selected system scenarios in order to actively brake the motor, leading to a forced stop. This is achieved short-circuiting the rotor BEMF (Back Electro-Motive Force) thus rapidly halting motor rotation in order to avoid injecting overvoltage phenomena into the battery line and generating undesired torque.

In a three-phase system, the ASC function can be implemented forcing the three HS switches OFF, while forcing the three LS ON, for instance.

The BRAKE pin is considered as the trigger for such function. For instance, the three HS pre-drivers might be programmed to force an OFF output when BRAKE is asserted, while the three LS switches might be programmed to force an ON output when BRAKE is asserted. A dual or complementary implementation where the ASC function is implemented forcing the three HS ON, while the three LS are forced OFF, is also possible.

In one or more embodiments, the BRAKE pin can be used as a trigger for the shoot-through pulse, with a logic function implemented in order to distinguish between a permanent ON condition (ASC function) and a short ON pulse (shoot-through), corresponding to two different system reactions.

As illustrated in FIG. 3A, such a logic function can be implemented via a dual threshold comparator 91, 92 with an input voltage corresponding to the BRAKE input voltage is applied (e.g. at the non-inverting inputs) of two comparators 91, 92 having respective "digital" and "power" threshold values (applied to the inverting inputs, for instance) 91A, 92A.

As illustrated in FIG. 3A, the outputs from the two comparators 91, 92 are applied (in a logically complemented form, in the case of the output from the comparator 92) to the input of an AND gate 93 which also receives (as a third, gating input) a SAFE_SEL signal. The output from the AND gate 93 is applied to one of the inputs of an OR gate 94 which receives as a second input an SPI enable signal shoot_en_spi so that the output signal i_shoot_en results from OR-ing the output from the AND gate 93 and the signal shoot_en_sp.

If the input voltage (BRAKE) is higher than the "digital" threshold 91A (e.g. 3.5V, determined according 5V CMOS logic standard), but lower than the "power" threshold 92A (e.g. 9V), the gate pre-driver 20 triggers the execution of the shoot-through pulse as further discussed in the following.

If the input voltage (BRAKE) is higher than both the "digital" and the "power" thresholds, the gate pre-driver generates a continuous ON condition used to implement the ASC function.

Such a function is per se conventional in the art, which makes it unnecessary to provide a more detailed description herein. It will otherwise be noted that one or more embodiments facilitate exploiting a single HV side pin to implement both shoot-through and ASC functions, thus limiting the number of pins on the HV side of the gate pre-driver package.

Figure 4:
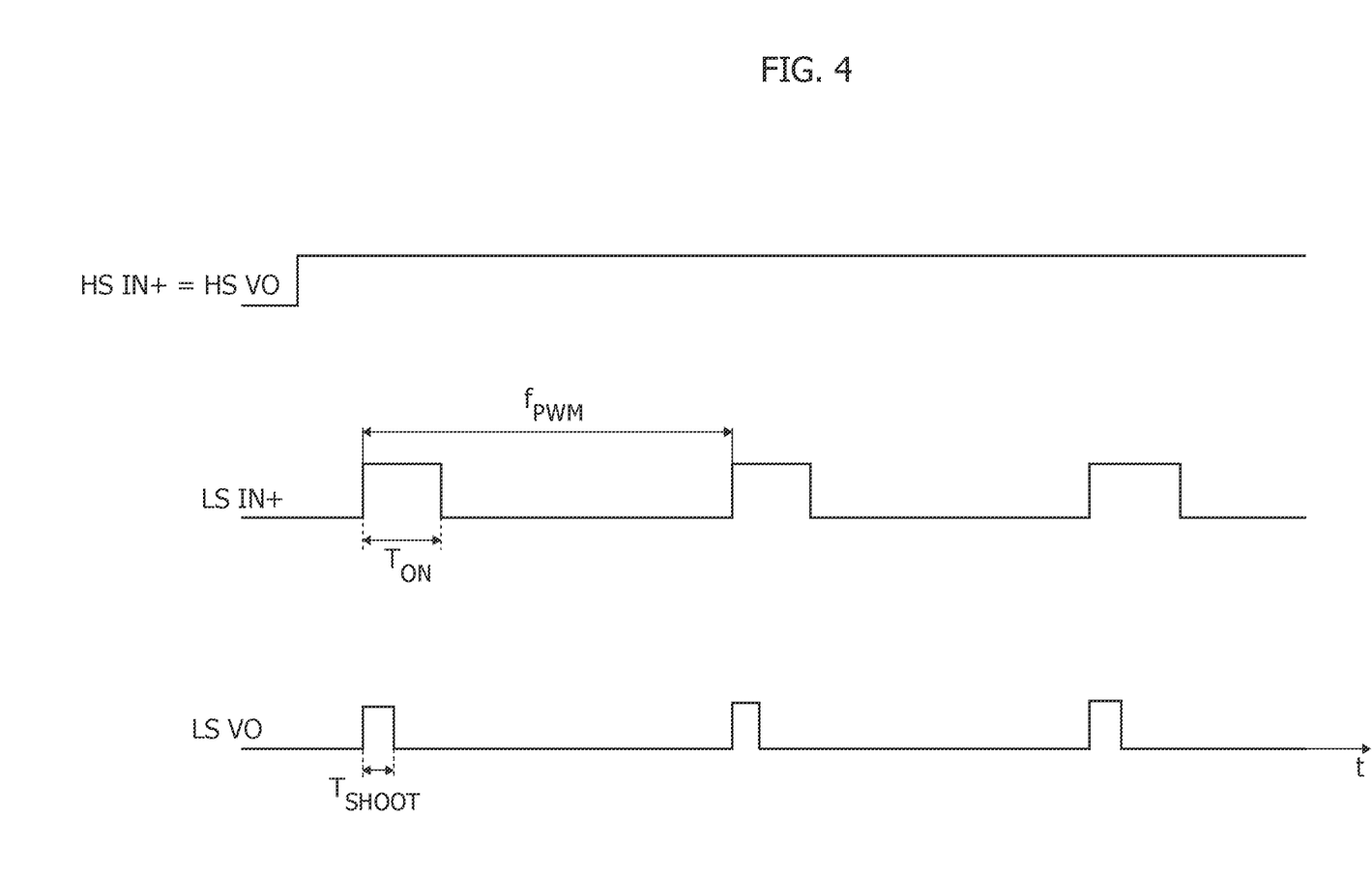
FIGS. 4 and 5 comprise various time diagrams exemplary of a possible time behaviour of signals.
Figure 5:
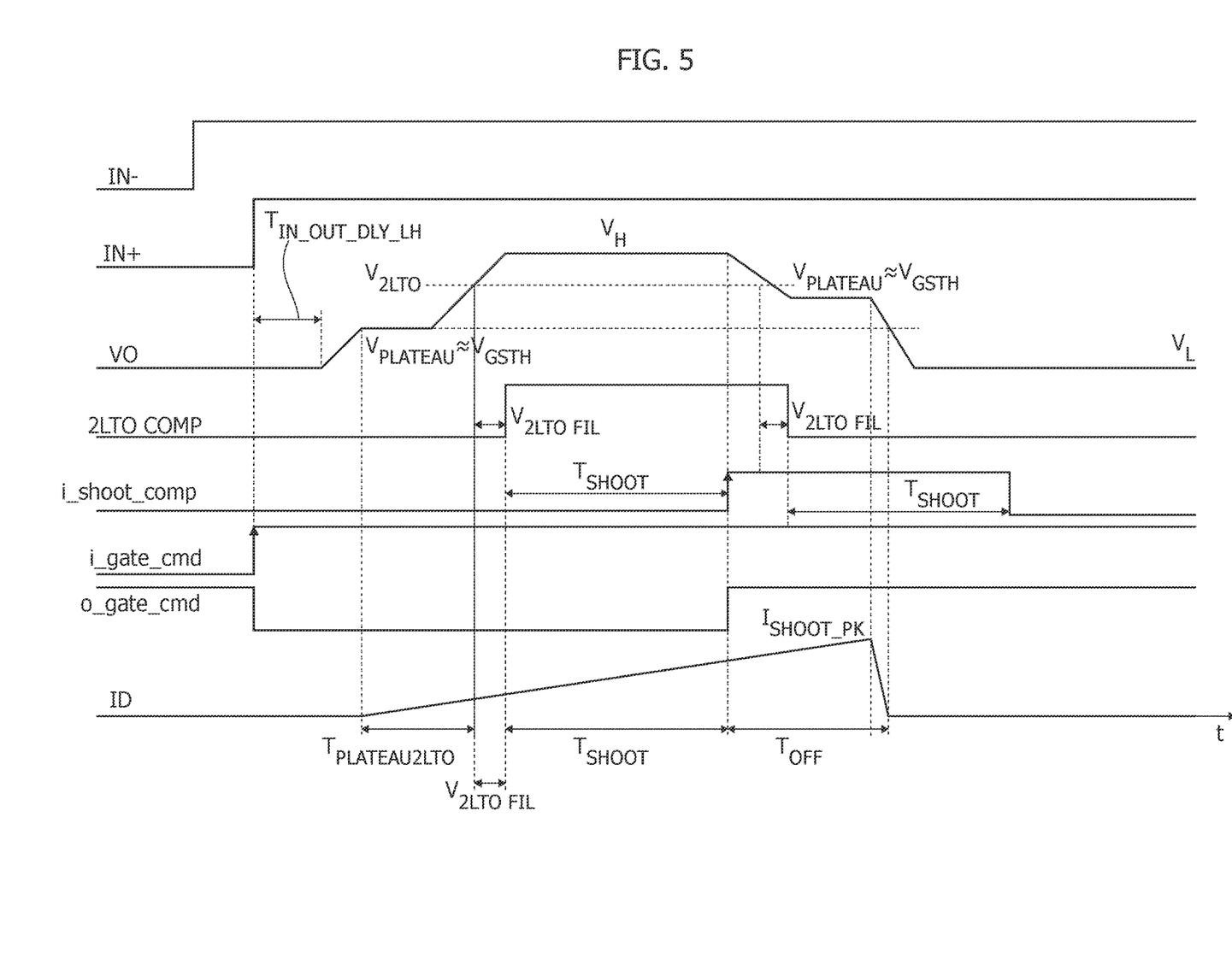

FIGS. 4 and 5 comprise various time diagrams which portray (against a common abscissa time scale) possible time behaviours of signals which may occur in embodiments as per the present description.

Specifically, in FIG. 4—which refers to "normal" operation of the circuit 20 (no DC-Link discharge enabled)—the following signals are exemplified in FIG. 4 (from top to bottom):

a step-like input signal HS IN+ applied to the high-side switch (here 21) resulting in an output signal HS VO at the node VO+, so that the high-side switch 21 is set to an "on" (conductive) state;

a pulsed input signal LS IN+ applied to the low-side switch (here 22): this can be regarded as a PWM—modulated signal having "on" times (switch 22 conductive) with a duration $T_{ON}$ and a frequency $f_{PWM}$, a resulting, likewise PWM-modulated signal LS VO at the node VO-, having "on" times with a duration $T_{SHOOT}$ and a frequency $f_{PWM}$, the rise times of the pulses in LS IN+ being aligned with the rise times of the pulses in LS VO.

The signals HS IN+ and LS IN+ applied to the switches 21 and 22 via the drive circuits 31, 32 can be assumed to be produced (in a manner known per se to those of skill in the art) under the control of the gate drive logic 40 in response to the signal i_gate_cmd (see FIG. 3, top left) being asserted during normal circuit operation (shoot-through enable signal SHOOT_EN such as i_shoot_en applied to the flip-flop 80 not asserted).

It is noted that, in a circuit as exemplified in FIG. 3, irrespective of other factors, if the PRESET input to the flip-flop 80 is "low", the output goes to "1" (which corresponds to the "off" state of the outer switch SP). Conversely, if the PRESET input "high", the flip-flop behaves as a conventional rising-edge triggered flip-flop.

The signal i_gate_cmd as exemplified in FIG. 3 can be regarded as resulting from the combination of two signals:

a turn-on/turn-off signal from the LV domain resulting for combining the inputs IN+/IN- of the pre-driver circuit, a turn-on/turn-off signal from the HV domain, resulting from sensing the BRAKE pin.

By way of example, the signal i_gate_cmd can go "high" is response to an "on" command from a controller on the LV side or from a "safing" logic on the HV side Each of these two events can generate a corresponding "on" trigger.

FIGS. 4 and 5 are exemplary of embodiments where circuit operation (primarily DC-Link discharge operation) involves forcing the high-side (HS) switch 21 to a steady "ON" (conductive) state and applying some sort of PWM signal is applied to a the low-side LS switch 22. As discussed previously, one or more embodiments may adopt a complementary approach where the low-side switch LS is forced to a steady "ON" state and a PWM signal is applied to the high-side switch LS.

FIG. 5 refers to shoot-through DC-Link discharge operation (i_gate_cmd de-asserted and shoot-through enable signal SHOOT_EN such as i_shoot_en applied to the AND gate 70).

For the sake of simplicity, FIG. 5 represents the situation from the perspective of a single gate driver, with each gate driver having two inputs IN- e IN+ to implement (in a manner known per se to those of skill in the art) an interlocking function.

Specifically, only the gate driver which performs the controlled shoot-through action (here, the LS gate driver 22) is considered for simplicity, assuming that the complementary switch (here, the HS gate driver 21) is controlled to be steadily on (that is conductive).

It is again recalled that one or more embodiments may adopt a complementary approach, where the low-side switch LS is forced to a steady "ON" state and the high-side switch HS performs the controlled shoot-through action.

In the exemplary case considered herein, as seen from the low-side switch LS, the input IN- represents the state of the high-side switch HS (which is not controlled directly, but is just "observed"); conversely the input IN+ represents the state of the low-side switch LS, which is controlled by the pre-driver circuit.

Conventionally, in response to IN- being high, a pre-driver as illustrated herein can be configured to prevent turn-on, masking IN+(this is currently referred to as "interlocking"). As discussed previously, one or more embodiments may contemplate disabling interlocking in the presence of shoot-through.

The following signals are exemplified in (again from top to bottom) by referring this time to shoot-through DC-Link discharge operation (i_gate_cmd de-asserted and shoot-through enable signal SHOOT_EN such as i_shoot_en applied to the flip-flop 80):

a step-like input signal IN-, a step-like input signal IN+, a resulting output voltage VO as applied to the control terminal of the power transistor SP, the output voltage 2LTO COM from the comparator 50, the signal i_shoot_comp applied by the delay circuit 60 to one of the input of the AND gate 70, the signal i_gate_cmd applied to the gate drive logic 40, the signal o_gate_cmd derived from the Q output of the flip-flop 80, and the discharge current ID through the of the power transistor SP.

It is noted that the voltage VO starts rising with a delay $T_{IN\_OUT\_DLY\_LH}$ with respect to the rising edges of i_gate_cmd (and IN+), such delay being set via i_shoot_dly, to reach and maintain a "plateau" value $V_{PLATEAU}$ approximately equal to a threshold value $V_{GSTH}$ of the gate-to-source voltage of the transistor SP to effect a zero-current switching after which VO starts rising again towards the voltage $V_H$ by crossing a value $V_{2LTO}$ (reference input to the comparator 50).

In response thereto, the output signal 2LTO COMP from the comparator 50 switches (from "0" to "1", for instance) with a delay $T_{2LTO\_FIL}$ with respect to the instant VO has crossed the value $V_{2LTO}$, such a delay being related to the bandwidth of the (fast) comparator 50 (few ns, for instance).

Likewise, after a time $T_{SHOOT}$ the signals i_shoot_comp and o_gate_cmd both switch (from "0" to "1", for instance) this resulting in VO starting decreasing from VH towards the value $V_{PLATEAU}$ (which is different from $V_{GSTH}$ due to this being a hard switching condition) which is maintained for a while, after which VO decreases back to zero.

The signal VO fallen below V2LTO is mirrored (again with a delay $T_{2LTO\_FIL}$) by the output signal 2LTO COMP from the comparator 50 switching back (from "1" to "0", for instance), which is followed, after the time $T_{SHOOT}$ by the signal i_shoot_comp switching back from "1" to "0", for instance.

It will thus be appreciated that the dominating factor in determining the $T_{ON}$ time of the discharge switch SP are the two rising edges of i_gate_cmd (on the left side of FIG. 5) and i_shoot_comp (approximately at the center of FIG. 5), which cause turn-on and turn-off at the control terminal (gate) $G_{SP}$ of the discharge switch SP.

In FIGS. 3 and 5, the HV driver 21 can be assumed to start from the OFF state (VO=low, ID=0, not conducting any current).

Consistently, the output of the fast analog comparator 50 delayed by the delay circuit 60 (that is, i_shoot_comp) assumes its idle state ("low").

The i_gate_cmd trigger command is considered to be aligned to the output OFF state ("low"). As illustrated herein, the signal o_gate_cmd corresponding to the output of the flip-flop 80 is in the OFF state ("high").

Alternative implementations leading to the same effects can be easily devised by those of skill in the art.

The control signal for the "turn-ON" transition of the switch SP is generated at the node receiving the signal i_gate_cmd node, which can be considered as the trigger input for the circuit.

In a manner known to those of skill in the art, such a triggering event can be generated by any entity of the system in FIG. 1.

For instance, a controller such as 100 can trigger the turn-on according to the PWM generated by its control algorithm. Differently, the turn-on event can be triggered by LV/HV sections such as 102 and 104 in the gate pre-driver (for instance, by means of internal timers).

Also, the trigger event can be generated by a control logic implemented in the HV power stage (e.g. a safety MCU/logic in the block 108).

In such a scenario, the control signal can be fed directly to the HV side pins of a gate pre-driver in the block 106.

Regardless of the trigger injection point, a circuit 20 as exemplified herein can "observe" the effects of the switch-ON command right at its destination node that is at the control terminal (gate) of the HV discharge switch SP.

A fast comparator such as 50 (with a reaction time of few ns) is able to provide a quick feedback of the gate voltage status, reported by the "2LTO COMP" signal. The comparison can be made in respect to a programmable voltage threshold (say "V2LTO", whose value can be adjusted to adapt the circuit behavior to the different types of HV drivers (SiC, IGBT, MOSFET, etc.). Such a voltage can be judiciously selected in order to cause the comparator 50 to toggle (only) when the HV driver is considered ON.

A programmable delay circuit 60 ("TSHOOT"), here exemplified as RC circuit (as discussed, alternative implementations may include a chain of digital inverters or a capacitor/current circuit), is provided in order to further delay the comparator toggle event, which facilitates fine tuning to the ON time of the HV driver.

As discussed, the signal i_shoot_comp signal is an (accurately) delayed version of the signal 2LTO COMP from the comparator 50. This provides flexibility in determining the (maximum) current peak $I_{SHOOT\_PK}$ reached during the shoot-through.

The ON time can thus be selected by acting on the programmable delay circuit 60 in such a way to prevent SOA violation in the worst case condition. Such programmability is advantageous in finely tuning the closed loop speed according to the different types of HV drivers (IGBT, SiC, MOSFET).

Optionally, the programmable delay 60 can be "excluded" from the closed loop (this amount to setting the delay to zero) so that the output of the fast comparator 50 is coupled to the circuitry 70, 80 with no delay applied.

As illustrated herein, the signal i_shoot_comp output by the delay circuit 60 drives a mixed-signal circuit 70/80 comprising discrete logic gates/flip-flops/latches.

As illustrated herein, the signal o_gate_cmd from the flip-flop 80 is coupled to the functional gate drive path at 40 with the purpose of conditioning the output from the gate drive logic 40 in such a way to generate an ON command in response to a trigger event generated via the i_gate_cmd signal.

Moreover, a circuit as illustrated herein generates an OFF command when i_shoot_comp (delayed output from the comparator 50) reports a rising edge.

It is noted that that the functional gate drive path at 40 may be configured to ignore the o_gate_cmd input in the presence of higher priority signals (for instance, an over-current/short-circuit/desaturation event). While not mandatory, such a strategy may be advantageous insofar as it facilitates achieving circuit robustness against HV driver SOA violation.

The implementations described above illustrate a circuit capable of determining the exact HV-driver turn ON time during shoot-through. Performance of the circuit is not affected by the uncertainty added by system blocks of FIG. 1.

The only remaining uncertainty is related to the closed feedback network, whose accuracy can be finely tuned in the hardware design phase according to application specifications.

Such kind of operation facilitates an accurate control of the intensity of the current through the switch SP in response to the feedback action implemented by sensing—at the node MC—the (actual) gate voltage of the switch SP, and thus the actual duty-cycle of the PWM signal applied thereto.

Such a gate voltage is compared (at the comparator 50) with a reference value (V2LTO). This facilitates selectively varying (that is, programming)—taking into account the specific features of the circuit/system involved—the delay applied at 60 to the signal which is fed back to the control logic 40 in order to manage the switches 21 and 22 (primarily the switch 22 during shoot-through operation). As a result, the switch SP may effectively control discharge of the energized element (a DC-Link capacitor LC, for instance) while countering (primarily as a result of the controlled behavior of VO in FIG. 5) any undesired "skyrocketing" of the discharge current ID.

As exemplified in the bottom curve in FIG. 5, in one or more embodiments, the discharge current ID can be approximated with a sawtooth waveform rising from zero to a peak value $I_{SHOOT\_PK}$ which depends on shoot-through duration and parasitic inductance over a time interval resulting from the sum of four time intervals:

the time $T_{PLATEAU2LTO}$ taken by VO to rise to $V_{2LTO}$;
the delay $T_{2LTO\_FIL}$;
the time $T_{SHOOT}$;
the time $T_{OFF}$ taken by VO to decrease from $V_H$ to $V_{PLATEAU}$ plus the time $V_{PLATEAU}$ is maintained.

The values $T_{2LTO\_FIL}+T_{SHOOT}$ can be regarded as exemplary of the duty cycle of PWM signal which can be set with a small error at turn-on since $V_{2LTO}=V_{PLATEAU}$ and a similarly small error at turn-off ($T_{OFF}$ can be ignored).

It will be appreciated that the time $T_{PLATEAU2LTO}$ can be disregarded insofar as it generates an error in the current peak estimation which can be taken into account by fine tuning the values for TSHOOT and V2LTO during bench trials.

The same also applies to the period $T_{PWM\_SHOOT}$, that is the period of the PWM signal generated by the "safing" logic. This can fixed (e.g. corresponding to 20 kHz) or variable.

For instance, one may take into account the fact that the peak current $I_{SHOOT\_PK}$ will decrease as the DC-Link is gradually discharged and increase the PWM frequency as discharge progresses.

In fact, assuming that $I_{SHOOT\_PK}$ is constant at each discharge cycle, the QCycle subtracted at each PWM cycle can be estimated as $$Q_{CYCLE}=(T_{2LTO\_FIL}+T_{SHOOT})*I_{SHOOT\_PK}$$

Assuming that at the beginning of turn-off a charge $Q_{DC\_LINK}=C_{DC\_LINK}*V_{DC\_LINK}$ is stored in the DC-Link (where $C_{DC\_LINK}$ and $V_{DC\_LINK}$ are the capacitance of the DC-Link and the voltage applied across the DC-Link) the number of PWM cycles $N_{CYCLES}$ leading to fully discharge the DC-Link can be estimated as $$N_{CYCLES}=Q_{DC\_LINK}/Q_{CYCLE}$$

By way of reference, for a fixed-frequency PWM discharge:

a 600 µF DC-Link can be discharged using a 10 kHz PWM and a 200 ns total opening time (this may be advantageous for IGBT switches);

a 1 mF DC-Link can be discharged using a 20 kHz PWM and a 200 ns total opening time (this may be advantageous for SiC switches.

In fact, the DC-Link voltage fades as the DC-Link discharge progresses and the slope of the current decreases accordingly, so that the $I_{SHOOT\_PK}$ becomes increasingly smaller.

The discharge current (ID) is not constant throughout the shoot-through iterations insofar as at each discharge cycle, the slope (A/ns) and the peak ($I_{SHOOT\_PK}$) will decrease due to the decrease of the voltage across the DC-Link.

In order to compensate such an effect, the "safing" logic may put in place two strategies (these may also be implemented in parallel):

increasing the PWM frequency (reducing $T_{PWM\_SHOOT}$) in order to have smaller peaks at a higher repetition rate, and/or programming a wider shoot-through time ($T_{SHOOT}$) as the DC-Link voltage decreases (this is facilitated in the case of access to SPI).

Controller logic may thus implement a strategy where the $T_{PWM\_SHOOT}$ can be decreased based on the DC-Link voltage.

Discharge time can be further decreased by programming a longer $T_{SHOOT}$, which may involve a judicious trade-off with undesired overstress of the DC-Link capacitor and the traction module drivers.

A shoot-through discharge solution as exemplified herein was found to provide a viable alternative to active discharge as conventional in the art, with the capability of meeting discharge timing specifications in actual application scenarios.

One or more embodiments as discussed herein were found to be cost-effective, with the capability of providing BoM savings in comparison with active discharge circuits.

This may be related, i.e., to the capability of disabling interlocking and/or the possibility of exploiting an existing (2LTO) comparator such as 50 for generating small turn-on pulses. Shoot-through discharge implemented via one or more embodiments may benefit from the re-use of an existing 2LTO comparator in terms of small area.

Shoot-through discharge implemented via one or more embodiments may likewise benefit from the presence of a dedicated enable bit in the SPI reg map as discussed previously, with no adverse effects on safety due to the maintained presence of (e.g. DES/ISEN) diagnostics. To that effect, a blanking time can be applied to DES/ISEN diagnostics. For instance, such a blanking time can be higher than or equal to the $T_{SHOOT}$ time (as programmed via SPI, for instance), so that these diagnostics remain active, while masked during shoot-through.

Digital SPI registers can be advantageously obtained by exploiting existing ADC_POL registers (as used for the VGE monitor filter). No new registers and/or modifications of existing communication protocol are involved.

A circuit (20) as exemplified herein may comprise:

drive circuitry (for instance, 21, 22, 31, 32, 40) configured to be coupled (for instance, VO+, VO−, RCHG, RDCHG) to a control terminal (for instance, $G_{SP}$) of an electronic switch (for instance, SP) and to apply to said control terminal a discharge signal (see, for instance, VO in FIG. 5 and the corresponding behaviour of the discharge current ID) causing said electronic switch to become conductive and provide an electrical discharge path for an energized element (for instance, LC), a sensing node (for instance, MC) configured to be coupled to said control terminal and to sense the voltage at said control terminal, a feedback network (for instance, 50, 60, 70, 80) coupled between said sensing node and said drive circuitry, the drive circuitry configured to produce said discharge signal as a function of the outcome of comparing (for instance, at so) with a reference threshold (for instance, V2LTO) a voltage at said control terminal sensed at said sensing node.

In a circuit as exemplified herein, said feedback network may comprise a comparator circuit (for instance, so) coupled to said sensing node and configured to compare with said reference threshold said voltage at said control terminal sensed at said sensing node, wherein the comparator circuit is configured to provide a comparison signal (for instance, 2LTO COMP) having a first value and a second value, respectively, in response to the voltage at said control terminal being higher or lower than said reference threshold.

In a circuit as exemplified herein, said feedback network may comprise a delay circuit (for instance, 60) coupled to the comparator circuit and configured to provide to said drive circuitry a delayed replica (for instance, i_shoot_comp) of said comparison signal.

In that way, the discharge process can be controlled accurately (for instance, with a delay of the delayed replica selected in the range 0-70 ns) at the control terminal (for instance, $G_{SP}$) of the electronic switch (for instance, SP) countering uncontrolled undesired increase of the discharge current.

In a circuit as exemplified herein, said delay circuit (for instance, 60) may comprise a programmable (for instance, i_shoot_dly) delay circuit configured to apply to said comparison signal from the comparator circuit a delay having a delay value selected out of a plurality of delay values (for instance a selected number of delay steps of 5-10 ns).

In a circuit as exemplified herein, said delay circuit may be configured to be programmed (for instance, via i_shoot_dly) to provide to said drive circuitry said comparison signal from the comparator circuit with a zero delay value.

In a circuit as exemplified herein, said delay circuit may comprise one of:
  a chain of logic inverters,
  a capacitor/current circuit, and/or
  a RC lowpass network.

In a circuit as exemplified herein, said drive circuitry may be configured to vary (that is, to increase and/or decrease) the duration and/or the frequency of said discharge signal (see, for instance VO in FIG. 5) as a function of (see, for instance, VO in FIG. 5 starting to decrease from $V_H$ in response to i_shoot_comp going "high") said comparison signal in a sequence of discharge cycles of said energized element.

In a circuit as exemplified herein, said drive circuitry may be configured to vary, in response to the charge of said energized element decreasing during said sequence of discharge cycles, at least one of the frequency and the duration of said discharge cycles.

In a circuit as exemplified herein, said drive circuitry may comprise logic circuitry (for instance, 40) configured to operate the circuit:
  in a functional (operational) state, wherein the drive circuitry applies to said control terminal a PWM-modulated signal causing said electronic switch to be alternately conductive and non-conductive, or
  in a discharge state, wherein the drive circuitry applies to said control terminal said discharge signal causing said electronic switch to become conductive and provide an electrical discharge path for an energized element.

A circuit as exemplified herein may comprise a threshold comparator (for instance, 91, 92) coupled to said drive circuitry (see, for instance, the signal i_shoot_en applied to the logic 40 via the AND gate 70 and the flip-flop 80) and configured to receive a command signal (for instance, BRAKE in FIG. 3A), wherein said logic circuitry (40) is configured to operate:
  in said functional state, in response to said command signal received at the threshold comparator having a first value,
  in said discharge state, in response to said command signal received at the threshold comparator having a second value.

In a circuit as exemplified herein, the drive circuitry may comprise:
  a first electronic switch (for instance, 21) configured (for instance, VO+, RCHG), in a conductive state, to couple said control terminal (for instance, $G_{SP}$) to a high-side voltage node (for instance, VH),
  a second electronic switch (for instance, 22) configured (for instance, VO−, RDCHG), in a conductive state, to couple said control terminal (for instance, $G_{SP}$) to a low-side voltage node (VL),
  switch drive circuitry (for instance, 31, 32) configured to bring (both) said first electronic switch and second electronic switch to a conductive state to cause said electronic switch to become conductive and provide an electrical discharge path for an energized element.

In a circuit as exemplified herein, said first electronic switch and said second electronic switch may be configured to be coupled to said control terminal via respective coupling resistors (for instance, RCHG, RDCHG).

A system (for instance, 10) as exemplified herein may comprise:
  an electronic switch (for instance, SP) having a control terminal (for instance, $G_{SP}$), the electronic switch configured to provide an electrical discharge path for an energized element (for instance, LC) in response to a discharge signal (see, for instance, VO in FIG. 5) applied to said control terminal,
  a circuit as exemplified herein, having said drive circuitry coupled (see, for instance, VO+, VO−, RCHG, RDCHG) to said control terminal of said electronic switch to apply to said control terminal said discharge signal causing said electronic switch to become conductive and provide an electrical discharge path for an energized element.

A system as exemplified herein may comprise a low-voltage domain (wo, LV) and a high-voltage domain (102, 104, 106, 108, HV), and a circuit as exampled herein (for instance, 20) included together with said electronic switch in the high-voltage domain of the system.

A system as exemplified herein may comprise an electric motor (for instance, M) having at least one winding configured to be selectively energized via at least one phase switch coupled therewith, wherein said electronic switch (for instance, SP) comprises said at least one phase switch (for instance, Q1, Q2).

A motor vehicle (for instance, V) equipped (powered) with a system as exemplified herein may comprise said electric motor (for instance, M) to provide electric traction power for the vehicle, wherein the vehicle comprises a DC-Link capacitor (for instance, LC) wherein said electronic switch (for instance, SP; Q1, Q2) is configured to provide an electrical discharge path for said DC-Link capacitor.

As exemplified herein, a method of operating an electronic switch (for instance, SP) providing an electrical discharge path for an energized element (for instance, LC), the electronic switch having a control terminal (for instance, $G_{SP}$), may comprise:
  applying to said control terminal a discharge signal causing said electronic switch to become conductive and provide said electrical discharge path for an energized element (see, for instance, VO in FIG. 5 and the corresponding behaviour of the discharge current ID),
  sensing (for instance, at MC) the voltage at said control terminal,
  producing said discharge signal (see, for instance, VO in FIG. 5) in a closed-loop feedback arrangement as a function of the voltage sensed at said control terminal ($G_{SP}$),
  wherein the method comprises:
  comparing the voltage at said control terminal with a reference threshold (for instance, V2LTO) and producing said discharge signal in a closed-loop feedback arrangement as a function of a comparison signal (for instance, 2LTO COMP) having a first value and a second value, respectively, in response to the voltage at said control terminal being higher or lower than said reference threshold.

A method as exemplified herein may comprise producing said discharge signal in a closed-loop feedback arrangement as a function of a delayed replica (for instance, i_shoot_comp) of said comparison signal.

In that way, the discharge process can be controlled accurately (for instance with a delay of the delayed replica selected in the range 0-70 ns) countering uncontrolled undesired increase of the discharge current.

Without prejudice to the underlying principles, the details and embodiments may vary, even significantly, with respect to what has been described by way of example only without departing from the extent of protection.

The extent of protection is determined by the annexed claims.

What is claimed is:

1. A circuit comprising:
    drive circuitry configured to be coupled to a control terminal of an electronic switch and configured to apply a discharge signal to the control terminal causing the electronic switch to become conductive and provide an electrical discharge path for an energized element;
    a sensing node configured to be coupled to the control terminal and configured to sense a voltage at the control terminal; and
    a feedback network coupled between the sensing node and the drive circuitry,
    wherein the feedback network comprises a comparator circuit coupled to the sensing node and configured to:
        compare the voltage at the control terminal and sensed at the sensing node with a reference threshold, and
        provide a comparison signal having a first value and a second value, respectively, in response to the voltage at the control terminal being higher or lower than the reference threshold,
    wherein the feedback network further comprises a delay circuit coupled to the comparator circuit and configured to provide a delayed replica of the comparison signal to the drive circuitry in order counter an uncontrolled increase of a discharge current in the discharge path, and
    wherein the drive circuitry is configured to produce the discharge signal as a function of the comparison signal.

2. The circuit of claim 1, wherein the delay circuit comprises a programmable delay circuit configured to apply to the comparison signal a delay having a delay value selected from a plurality of delay values.

3. The circuit of claim 2, wherein the delay circuit is configured to provide the comparison signal to the drive circuitry with a zero-delay value.

4. The circuit of claim 2, wherein the delay circuit comprises a chain of logic inverters, a capacitor/current circuit, and/or a RC a lowpass network.

5. The circuit of claim 1, wherein the drive circuitry is configured to vary a duration and/or a frequency of the discharge signal as a function of the comparison signal in a sequence of discharge cycles of the energized element.

6. The circuit of claim 5, wherein the drive circuitry is configured to vary, in response to a charge of the energized element decreasing during the sequence of discharge cycles, at least one of the frequency or the duration of the discharge cycles.

7. The circuit of claim 1,
    wherein, in a functional state, the drive circuitry is configured to apply a PWM-modulated signal to the control terminal causing the electronic switch to be alternately conductive and non-conductive, or
    wherein, in a discharge state, the drive circuitry is configured to apply the discharge signal to the control terminal causing the electronic switch to become conductive and provide the electrical discharge path for the energized element.

8. The circuit of claim 7, further comprising:
    a threshold comparator coupled to the drive circuitry and configured to receive a command signal,
    wherein a logic circuitry of the drive circuitry is configured to:
        in response to the command signal received at the threshold comparator having a first value, operate the circuit in the functional state, and
        in response to the command signal received at the threshold comparator having a second value, operate the circuit in the discharge state.

9. The circuit of claim 1, wherein the drive circuitry comprises:
    a first electronic switch configured to couple, in a conductive state, the control terminal to a high-side voltage node;
    a second electronic switch configured to couple, in a conductive state, the control terminal to a low-side voltage node; and
    switch drive circuitry configured to bring the first electronic switch and the second electronic switch to the conductive state to cause the electronic switch to become conductive and provide the electrical discharge path for the energized element.

10. The circuit of claim 9, wherein the first electronic switch and the second electronic switch are configured to be coupled to the control terminal via respective coupling resistors.

11. A system comprising:
    the circuit of claim 1, wherein the circuit is coupled to the electronic switch comprising the control terminal.

12. The system of claim 11,
    wherein the system comprises a low-voltage domain and a high-voltage domain, and
    wherein the circuit is together with the electronic switch in the high-voltage domain.

13. The system of claim 11, further comprising an electric motor having at least one winding configured to be energized via at least one phase switch coupled therewith, wherein the electronic switch comprises the at least one phase switch.

14. A motor vehicle comprising:
    the system according to claim 13,
    wherein the electric motor is configured to provide electric traction power for the vehicle,
    wherein the vehicle comprises a DC-Link capacitor in the energized element, and
    wherein the electronic switch is configured to provide the electrical discharge path for the DC-Link capacitor.

15. A circuit comprising:
    drive circuitry configured to be coupled to a control terminal of an electronic switch and configured to apply a discharge signal to the control terminal causing the electronic switch to become conductive and provide an electrical discharge path for an energized element;
    a sensing node configured to be coupled to the control terminal and configured to sense a voltage at the control terminal;
    a feedback network coupled between the sensing node and the drive circuitry,
    wherein the feedback network comprises a comparator circuit coupled to the sensing node and configured to:
        compare the voltage at the control terminal and sensed at the sensing node with a reference threshold, and provide a comparison signal having a first value and a second value, respectively, in response to the voltage at the control terminal being higher or lower than the reference threshold, wherein, in a functional state, the drive circuitry is configured to apply a PWM-modulated signal to the control terminal causing the electronic switch to be alternately conductive and non-conductive, or wherein, in a discharge state, the drive circuitry is configured to apply the discharge signal to the control terminal causing the electronic switch to become conductive and provide the electrical discharge path for the energized element; and a threshold comparator coupled to the drive circuitry and configured to receive a command signal, wherein a logic circuitry of the drive circuitry is configured to:
  in response to the command signal received at the threshold comparator having a first value, operate the circuit in the functional state, and
  in response to the command signal received at the threshold comparator having a second value, operate the circuit in the discharge state, and
  wherein the drive circuitry is configured to produce the discharge signal as a function of the comparison signal.

16. The circuit of claim 15, wherein the feedback network further comprises a delay circuit coupled to the comparator circuit and configured to provide a delayed replica of the comparison signal to the drive circuitry, and wherein the delay circuit comprises a programmable delay circuit configured to apply to the comparison signal a delay having a delay value selected from a plurality of delay values.

17. The circuit of claim 16, wherein the delay circuit is configured to provide the comparison signal to the drive circuitry with a zero-delay value.

18. A circuit comprising:
  drive circuitry configured to be coupled to a control terminal of an electronic switch and configured to apply a discharge signal to the control terminal causing the electronic switch to become conductive and provide an electrical discharge path for an energized element;
  a sensing node configured to be coupled to the control terminal and configured to sense a voltage at the control terminal; and
  a feedback network coupled between the sensing node and the drive circuitry,
  wherein the feedback network comprises a comparator circuit coupled to the sensing node and configured to:
    compare the voltage at the control terminal and sensed at the sensing node with a reference threshold, and
    provide a comparison signal having a first value and a second value, respectively, in response to the voltage at the control terminal being higher or lower than the reference threshold,
  wherein the drive circuitry comprises:
    a first electronic switch configured to couple, in a conductive state, the control terminal to a high-side voltage node;
    a second electronic switch configured to couple, in a conductive state, the control terminal to a low-side voltage node; and
    switch drive circuitry configured to bring the first electronic switch and the second electronic switch to the conductive state to cause the electronic switch to become conductive and provide the electrical discharge path for the energized element, and
  wherein the drive circuitry is configured to produce the discharge signal as a function of the comparison signal.

19. The circuit of claim 18, wherein the first electronic switch and the second electronic switch are configured to be coupled to the control terminal via respective coupling resistors.

20. The circuit of claim 18, wherein the feedback network further comprises a delay circuit coupled to the comparator circuit and configured to provide a delayed replica of the comparison signal to the drive circuitry, and wherein the delay circuit comprises a programmable delay circuit configured to apply to the comparison signal a delay having a delay value selected from a plurality of delay values.

* * * * *